(12) United States Patent
Kobayashi et al.

(10) Patent No.: US 6,984,435 B2
(45) Date of Patent: Jan. 10, 2006

(54) BIAXIALLY ORIENTED, LAMINATED POLYESTER FILM

(75) Inventors: Jun Kobayashi, Mishima (JP); Eiji Doi, Anpachi-gun (JP); Masanobu Dobuchi, Suntoh-gun (JP)

(73) Assignee: Toray Industries, Inc., (JP)

( * ) Notice: Subject to any disclaimer, the term of this patent is extended or adjusted under 35 U.S.C. 154(b) by 0 days.

(21) Appl. No.: 10/331,723

(22) Filed: Dec. 27, 2002

(65) Prior Publication Data

US 2003/0165665 A1   Sep. 4, 2003

(30) Foreign Application Priority Data

Dec. 27, 2001   (JP)   ............................. 2001-396704

(51) Int. Cl.
*B32B 5/30*   (2006.01)

(52) U.S. Cl. .................. 428/141; 428/143; 428/213; 428/480; 428/694 ST; 428/694 SL; 428/694 SG (58) Field of Classification Search ................ 428/141, 428/143, 694 ST, 694 SL, 694 SG, 213, 428/480
See application file for complete search history.

(56) References Cited

U.S. PATENT DOCUMENTS 5,648,035 A   7/1997 Okamoto et al.

FOREIGN PATENT DOCUMENTS

| EP | 0 347 646 A2 | 12/1989 |
|----|---|---|
| EP | 0 447 555 A1 | 9/1991 |
| EP | 0960 718 A1 | 12/1999 |
| EP | 0 995 593 A1 | 4/2000 |
| GB | 1 526 514 | 9/1978 |
| JP | 2001-335647 | 12/2001 |
| JP | 2001-341260 | 12/2001 |

*Primary Examiner*—William P. Watkins, III
(74) *Attorney, Agent, or Firm*—DLA Piper Rudnick Gray Cary US LLP

(57) ABSTRACT

A biaxially oriented, laminated polyester film having at least two layers, and in the film, an irregularity in film thickness determined within 4 mm width at an arbitrary position in a transverse direction of the film is about 0.1 μm or less. This polyester film can satisfy both the electromagnetic conversion property and the running ability at a high level, particularly when the film is used as a base film for a large capacity tape for data storage.

10 Claims, 2 Drawing Sheets

US 6,984,435 B2

BIAXIALLY ORIENTED, LAMINATED POLYESTER FILM

BACKGROUND

1. Field of the Invention

This invention relates to a biaxially oriented, laminated polyester film and, more specifically, to a biaxially oriented, laminated polyester film useful for magnetic recording media, stencil films and package materials. In particular, the invention is useful as a base film of a high-density magnetic recording medium for data storage such as an S-DLT (Super Digital Linear Tape) and an LTO (Linear Tape Open) having a capacity of 40 GB or more.

2. Description of the Prior Art

Recently, in the field of magnetic recording media, the technology for making a magnetic recording medium larger in capacity and higher in density has been developed, and accompanying therewith, it is required to make the base film of the medium flatter and thinner. Although the flatness of the base film is very important to achieve a good electromagnetic conversion property, if it is too flat, the roll formation of the film in the film manufacturing process, for example, in a process for winding the film as a roll, may deteriorate. Also in a process for processing a film, if the film is too flat, undesirable friction may occur between the film and a magnetic head and it may cause poor running ability of the film or may cause powder chipped from the film which induces dropout and, therefore, it is necessary to roughen the surface of the base film appropriately to ensure an appropriate slipperiness.

As a means for solving the above-described problems, a biaxially oriented, laminated polyester film having a laminated structure and having different slipperinesses on the surface and the back surface is known, wherein, in use for high-density magnetic recording media, for example, a surface to be provided with the magnetic layer is made flat and the other surface is made uneven to ensure a good running ability (for example, JP-A-2-77431).

On the other hand, it is also known that when an undesirable irregularity in thickness is present in a base film, it may cause irregularity in film properties ascribed to non-uniform heat transfer and may cause deterioration of the roll formation of a film roll. Especially in the use for magnetic recording media, because such an irregularity in thickness causes an irregularity in application in a film processing step, it should be improved. Films improved with irregularity in thickness in the longitudinal and transverse directions also are well known as a means for solving such problems. For example, JP-A-11-115043 discloses a method for preparing a film excellent in uniformity of thickness by optimizing orientation and crystallization of the film controlled by heat treatment in the longitudinal stretching process in the film manufacturing process. Further, JP-A-4-96370 discloses a method for making the film thickness uniform in the transverse direction by specifying the design of a die.

However, in a tape for data storage on which an extremely thin and flat magnetic layer and back coating layer are applied as compared with those in the conventional tapes to satisfy the large capacity/high density requirements, even if such a film controlled with irregularity in thickness and controlled with flatness as described above is used, required PES (Positioning Error Signal, a value representing an amount of positional shift in the transverse direction and a value of standard deviation o) and a required electromagnetic conversion property could not be obtained.

SUMMARY OF THE INVENTION

As the result of the investigation we carried out, we found that, in the aforementioned tape for data storage, in addition to the uniformity in thickness in the transverse direction of a base film determined over the entire width of the film or over a macro range in the transverse direction, a very fine irregularity in thickness of the base film, which has not been considered to be a problem in the conventional technology, remarkably influences the PES and the electromagnetic conversion property of a magnetic tape.

Accordingly, the invention provides a biaxially oriented, laminated polyester film which can remarkably improve the PES and the electromagnetic conversion property of a magnetic recording medium by controlling the fine irregularity in thickness of the film in the transverse direction within a specified range. The film has at least two layers and is characterized in that irregularities in film thickness determined within 4 mm width at an arbitrary position in a transverse direction of the film are about 0.1 μm or less.

The biaxially oriented, laminated polyester film according to the invention can satisfy an electromagnetic conversion property and a running ability at high levels, and it is very useful as a base film of a tape for data storage with a large capacity.

Further objects, features, and advantages of the invention will be understood from the following detailed description of selected preferred embodiments of the invention with reference to the accompanying figures.

BRIEF DESCRIPTION OF THE DRAWINGS

Selected preferred embodiments of the invention are now described with reference to the accompanying figures, which are given by way of example only, and are not intended to limit the invention.

DETAILED DESCRIPTION OF THE PREFERRED EMBODIMENTS

The invention is explained hereinafter in more detail together with preferred embodiments.

Although the polyesters referred to in the invention are not particularly limited as long as they are polyesters which can be formed as high-strength films by molecular orientation, it is preferred that the polyester films comprise polyethylene terephthalate or polyethylene-2,6-naphthalate. Namely, about 80% or more of the constituent of polyethylene terephthalate or polyethylene-2,6-naphthalate is ethylene terephthalate or ethylene naphthalate. As the remaining copolymerization components other than ethylene terephthalate or ethylene naphthalate, for example, diol components such as diethylene glycol, propylene glycol, neopentyl glycol, polyethylene glycol, p-xylilene glycol and 1,4-cyclohexane dimethanol, dicarboxylic acid components such as adipic acid, sebacic acid, phthalic acid, isophthalic acid and 5-sodium sulfoisophthalic acid, polyfunctional dicarboxylic acid components such as trimellitic acid and pyromellitic acid, or p-oxyethoxy benzoic acid, can be used.

Further, in the above-described polyester, at least one of a sulfonic alkali metal derivative non-reactive with polyester and a polyalkylene glycol substantially insoluble to polyester may be blended at a content less than about 5 wt %.

The biaxially oriented, laminated polyester film according to the invention is formed in a lamination structure having at least two layers. Although the number of the layers is not restricted as long as the number is two or more, in a case of a two-layer lamination structure, formation of protrusions on the surface (A) applied with a magnetic layer and on the opposite surface (B) can be easily controlled and, therefore, such a two-layer lamination structure is preferable to obtain the effects according to the invention to a greater extent.

In the biaxially oriented, laminated polyester film according to the invention, the thickness of the surface layer (B) is preferably in a range of about 0.1 to about 1.5 μm, more preferably in a range of about 0.2 to about 0.7 μm. If the thickness is less than about 0.1 μm, particles contained are likely to be dropped out, and if more than about 1.5 μm, the effect for forming protrusions by the added particles tends to decrease and it is not preferred.

In the biaxially oriented, laminated polyester film according to the invention, the irregularity in film thickness determined within 4 mm width at an arbitrary position in a transverse direction of the film is about 0.1 μm or less, preferably about 0.08 μm or less, more preferably about 0.05 μm or less.

Recently, to make the capacity for memory per one cassette tape larger, in addition to making the tape of one cassette longer by making the thickness of the tape smaller, an improvement for increasing the memory density in the transverse direction by decreasing the width of the memory track has been developed. In the case where the width of the memory track in a format is about 21 μm or less (for example, LTO or S-DLT), because the magnetic flux leaked from the magnetic tape becomes small, it is necessary to use an MR head utilizing a magneto-resistance effect type element as the head to be able to obtain a high output even if the magnetic flux is small. Although such an MR head can read a fine magnetic flux, because it is precise, it is very weak against an irregularity in the magnetic flux and the electromagnetic conversion property is liable to deteriorate. If a fine irregularity in thickness exists, a fine irregularity in tension occurs in the transverse direction of a tape when a magnetic layer is applied on the tape. Because this irregularity in tension causes an irregularity in application of magnetic layer and an irregularity in magnetic flux, ultimately, causes the electromagnetic conversion property to deteriorate, it is desirable that the fine irregularity in thickness is controlled in the range according to the invention.

On the other hand, if the width of the track is made small, reduction of a regenerative output ascribed to off tracking is liable to occur. For off tracking, recently a method was introduced wherein a track servo control is performed magnetically or optically and a head is controlled to follow a positional shift in the transverse direction of a tape. However, although the track servo mechanism can follow sufficiently against a mild positional shift in the transverse direction of a tape ascribed to an irregularity in thickness over the entire width of the tape or over a macro range, the head cannot follow against a sudden positional shift ascribed to a fine irregularity in thickness which exhibits as a steep irregularity of more than about 0.1 μm within 4 mm width shown in the invention, and in such a condition, storing and regenerating of data may be damaged.

Further, although a magnetic servo is carried out on a magnetic layer, because an optical servo is written on a backcoat layer, if the format is a new format (for example, S-DLT) using the optical servo, an irregularity in application of backcoat layer also is not allowed, and also from this point of view, the control of a fine irregularity in thickness within the range according to the invention is very important.

Moreover, when it is also considered that most tapes for data storage have widths in a range of 4 mm (DDS, etc.) to 12.7 mm (S-DLT, etc.), it is inevitable as a property of a base film that a fine irregularity in thickness more than that defined in the invention does not exist within the width specified in the invention. If a steep irregularity in thickness more than about 0.1 μm exists within the 4 mm width, a fine irregularity in application occurs when a magnetic layer or a backcoat layer is applied, and such a fine irregularity in application greatly deteriorates not only the electromagnetic conversion property, but also the positional shift in the transverse direction of the tape.

Further, in the invention, it is preferred that a ratio (σ/d) of a standard deviation of film thickness (σ) to an average film thickness (d) in the transverse direction of the film is about 0.015 or less. The ratio is preferably about 0.012 or less, more preferably about 0.010 or less. If the ratio (σ/d) is more than about 0.015, the roll formation, when the film is wound as a film roll, may deteriorate, and an irregularity in application may occur in a magnetic layer application process and it may cause the electromagnetic conversion property to deteriorate. Further, to decrease the irregularity in application, it is preferred that a ratio of a standard deviation of film thickness to an average film thickness in the longitudinal direction of the film, which is defined similarly to the ratio in the transverse direction, is also about 0.015 or less.

In the polyester film according to the invention, on a surface of at least one surface layer (A) (one outermost layer), a first protrusion-height distribution indicating a relationship between heights of protrusions ($H_A$ [nm]) and numbers of protrusions at respective protrusion heights ($Y_A$ [number/mm$^2$]) on the surface is controlled to satisfy the following equation (1).

$$-0.12 \times H_A + 4 \leq \log_{10} Y_A \leq -0.07 \times H_A + 5 \quad (1)$$

This protrusion-height distribution preferably satisfies the following equation (1-1).

$$-0.1 \times H_A + 4 \leq \log_{10} Y_A \leq -0.08 \times H_A + 5 \quad (1\text{-}1)$$

If the logarithmic value "$\log_{10} Y_A$" of the number of protrusions on the layer (A) is less than $-0.12 \times H_A + 4$, the slipperiness of the magnetic layer deteriorates and the running ability deteriorates by the friction with a magnetic head. On the other hand, if the logarithmic value "$\log_{10} Y_A$" of the number of protrusions is more than $-0.07 \times H_A + 5$, the surface after application of the magnetic layer becomes rough, the electromagnetic conversion property deteriorates.

In the polyester film according to the invention, further, a second protrusion-height distribution indicating a relationship between heights of protrusions ($H_B$ [nm]) and numbers of protrusions at respective protrusion heights ($Y_B$ [number/mm$^2$]) on a surface of the other surface layer (B) is controlled to satisfy the following equation (2).

$$-0.033 \times H_B + 4 \leq \log_{10} Y_B \leq -0.0125 \times H_B + 5 \quad (2)$$

This protrusion-height distribution preferably satisfies the following equation (2-2).

$$-0.027 \times H_B + 4 \leq \log_{10} Y_B \leq -0.0133 \times H_B + 5 \quad (2\text{-}2)$$

If the logarithmic value "$\log_{10} Y_B$" of the number of protrusions on the layer (B) is less than $-0.033 \times H_B + 4$, the slipperiness between films, wrinkles are generated when the film is wound in the form of a roll, and the yield of the product greatly deteriorates. On the other hand, if the logarithmic value "$\log_{10} Y_B$" of the number of protrusions is more than $-0.0125 \times H_B + 5$, because the rate of high protrusions increases, the surface of the magnetic layer becomes rough by transfer onto the magnetic layer surface side when the film is wound in the form of a roll or by pushing up in the calender process and, therefore, the electromagnetic conversion property deteriorates.

It is preferred to add inert particles in each layer to satisfy the above-described protusion-height distributions. Inert particles I used for the layer (A) preferably have a mean primary particle diameter of about 0.02 to about 0.15 μm, more preferably about 0.05 to about 0.10 μm, and a content of about 0.001 to about 0.25 wt %, more preferably about 0.05 to about 0.25 wt %.

With respect to the layer (B) in the invention, it is preferred that at least two kinds of inert particles II and III having mean particle diameters different from each other are contained in the surface layer (B). The mean particle diameter of the inert particles II is in a range of about 0.1 to about 0.4 μm, more preferably about 0.2 to about 0.4 μm, and the content thereof is in a range of about 0.1 to about 0.4 wt %, more preferably about 0.1 to about 0.3 wt %. The mean particle diameter of the inert particles III is greater than that of the inert particles II and is in a range of about 0.3 to about 1.0 μm, more preferably about 0.5 to about 0.9 μm, and the content thereof is in a range of about 0.002 to about 0.1 wt %, more preferably about 0.005 to about 0.08 wt %.

As the inert particles contained in the layers (A) and (B), inorganic particles such as spherical silica particles, aluminium silicate particles, titanium dioxide particles and calcium carbonate particles, and organic polymeric particles such as crosslinked polystyrene resin particles, crosslinked silicone resin particles, crosslinked acrylic resin particles, crosslinked polystyrene-acrylic resin particles, crosslinked polyester particles, polyimide particles and melamine resin particles, can be used. Among these particles, one kind of or two or more kinds of particles are selected to be used. For any kind of particles, the distributions of the particle form and the particle size preferably are as uniform as possible, and it is preferred to filter the particles, as needed. In particular, spherical silica particles are preferable for obtaining a better effect according to the invention because they are excellent in mono-dispersion property and formation of protrusions can be easily controlled. Further, as needed, inert particles selected from the group consisting of α-type alumina, γ-type alumina, δ-type alumina, θ-type alumina, zirconia, silica and titanium particles having a primary particle diameter of about 0.005 to about 0.10 μm, preferably about 0.01 to about 0.05 μm, may be contained in a range that does not influence the formation of surface protrusions, from the viewpoint of reinforcement of the skin of the film.

Further, in the polyester film according to the invention, it is preferred that Young's moduli in longitudinal and transverse directions of the film are in a range of about 3,500 to about 10,000 MPa, respectively, and the ratio of both Young's moduli (longitudinal/transverse) is in a range of about 1.0 to about 2.5, preferably about 1.2 to about 2.0, more preferably about 1.2 to about 1.5. If the Young's moduli in longitudinal and transverse directions of the film are less than about 3,500 MPa, a sufficient strength for a magnetic tape cannot be obtained, and if a strong force is applied to the tape when recorded or regenerated, the tape is likely to be easily broken. On the other hand, if more than about 10,000 MPa, because the draw ratio for film manufacture must be increased, film breakage frequently occurs, and the yield of the product greatly deteriorates.

If the ratio of both Young's moduli (longitudinal/transverse) is less than about 1.0, when the film is made into a magnetic tape, a sufficient longitudinal strength cannot be obtained, and if a strong force is applied to the tape in the longitudinal direction when recorded or regenerated, the tape is likely to be easily cut. On the other hand, if the ratio of both Young's moduli (longitudinal/transverse) is more than about 2.5, it is difficult to obtain a sufficient transverse strength of a magnetic tape, and because the contact between the tape and a magnetic head becomes weak, it becomes difficult to obtain a satisfactory electromagnetic conversion property.

Further, in the polyester film according to the invention, it is preferred that, on the surface of the surface layer (A), the number of large protrusions having a height of more than 0.270 μm is about 100/100 cm$^2$ or less, preferably about 20/100 cm$^2$ or less, the number of large protrusions having a height of more than 0.540 μm is about 2/100 cm$^2$ or less, preferably about 0.1/100 cm$^2$ or less, and the number of large protrusions having a height of more than 0.810 μm is about 0.1/100 cm$^2$. If the numbers of the respective large protrusions at the respective heights exceed the above-described values, the error rate of the magnetic tape increases.

In the biaxially oriented, laminated polyester film according to the invention, a layer having a good adhesive property may be provided on at least one surface of the film by applying a water-soluble or organic solvent-based coating material at a content that does not injure the effect according to the invention.

The thickness of the polyester film according to the invention is preferably in a range of about 2.0 to about 10.0 μm, more preferably in a range of about 3.0 to about 7.0 μm.

In the film of the invention, other kinds of polymers may be blended in a range that the effect according to the invention is not damaged, and organic additives such as antioxidant, thermal stabilizer, lubricant and ultraviolet ray absorbent may be added to the film at a content similar to a usual content.

Next, the method for preparing the biaxially oriented, laminated polyester film according to the invention will be explained.

As a method for containing inert particles in polyester, for example, inert particles I are dispersed in ethylene glycol, which is a diol component, at a predetermined content and in a formation of a slurry, and the ethylene glycol slurry is added at an arbitrary stage before the polymerization of polyester has been completed. For example, if the particles are added without drying a water sol or an alcohol sol obtained at the time of synthesis of the particles, a good dispersion property of the particles can be obtained, and the slipperiness and the electromagnetic conversion property can be both improved. Further, a method for blending a water slurry of particles directly with predetermined polyester pellets and kneading the particles into polyester by supplying the mixture to a vent-type twin screw extruder, is also effective. As a method for adjusting the content of the particles, a method is effective for preparing a high-density particle master by the above-described method, and adjusting the content of the particles by diluting the master with polyester, which substantially does not contain particles, at the time of film formation.

The polyester pellets prepared by the above-described method are blended at a predetermined rate, and after being dried, the pellets are supplied to a known extruder for melting and laminating. After the polymer is filtered, the polymer is delivered out from a die having a slit in a form of a sheet, and the sheet is cooled and solidified on a casting roll to prepare a non-stretched film. Namely, the polymers are laminated using two or three extruders and a manifold or a confluence block (for example, a confluence block having a rectangular confluence portion) for joining two or three polymer flows, the polymer is delivered out from a die in a form of a sheet, and cooled on a casting roll to prepare a non-stretched film.

The film characterized by the invention, in which the fine irregularity in thickness is controlled to be about 0.1 µm or less, can be achieved by the following conditions for film formation. Namely, to stabilize the flow state of the polymer in a filter and a pipe, it is effective to suppress the variation of the viscosity at an extrusion temperature of the molten polymer continuously extruded at about 200 poise or less (a value at a shear speed of 1000 sec$^{-1}$). To achieve this, for example, it is preferred to control the difference of melt viscosity between a thermoplastic resin A1 prepared by blending various pellets and a thermoplastic resin A2 with the same composition subsequently used within the above-described range. In a case where the film is continuously manufactured, subsequently used thermoplastic resins A3, A4, . . . , An are controlled similarly. In a case where the raw material of resin (pellets) is discontinuously supplied to a film formation apparatus, the difference between the supply batches can be reduced by the above-described control. Although the control of the melt viscosity can be performed by controlling polymerization temperature and time or/and kind and amount of catalyst, to prevent deterioration or color change of polymer, it is preferable to employ a method for appropriately adjusting the degree of vacuum or the torque of polymerization stirrer which affects the residual amount of ethylene glycol in a polymerization process, that is, the degree of polymerization. Further, a method for reducing an irregularity in temperature of a filter and a pipe and suppressing the variation of the melt viscosity of the polymer, and a method for using a static mixer in a polymer flow path for mixing the polymer, are also effective to make the melt viscosity of the polymer in a pipe uniform.

If the difference between the melt viscosities is more than the above-described value, the flow state of the polymer in a filter and a pipe is greatly disturbed. The variation of the flow state induces generation of a deteriorated polymer and adhesion of polymer to a slit die, and ultimately, it obstructs manufacture of a film having a uniform thickness. Further, to achieve selected objects of the invention, except the above-described methods, it is also effective to control the temperature of a slit die at a temperature higher than the extrusion temperature by about 5 to about 20° C., or to control the temperature or the humidity around the slit die to prevent adhesion of the deteriorated polymer to the slit die.

Further, to reduce the number of large protrusions, except reduction of large foreign materials in pellets, it is particularly effective to filtrate the polymer using a high-accuracy filter capable of trapping more than about 95% of foreign materials with a size of about 1.5 µm or more after passing through an extruder.

Furthermore, it is preferred to make the shapes of the pellets, prepared as a raw polymer to be blended, as similar as possible. The raw polymer is polymerized with a polymerization apparatus, and after reaching a predetermined degree of polymerization, the polymer is removed and cooled by water and, thereafter, cut by a cutter for preparing pellets. A difference in shape of the pellets occurs frequently as a result of the difference between used cutters or between delivering speeds. If the pellets used for the base polymer and the master pellets containing various particles and additives differ in shape from each other, it is not easy to blend them uniformly. Even if they are once blended uniformly, they tend to become nonuniform again by subsequent classification. This phenomenon is likely to occur particularly in the drying process, wherein the drift of the polymer flow originating from a difference between the flowablities exhibits itself at a subsequent melting or film formation process and, as a result, the fine irregularity in thickness, which is a target property in the invention, is influenced. To prevent this phenomenon, it is effective to control the difference between shapes of pellets (described later) at about 30% or less, preferably about 20% or less. Further, together with this control, it is preferred to prepare pellets having the same kind of shape, and it is preferred to use the same type of chip cutter (pellet cutter). In particular, it is effective to reduce the difference in shape of the pellets used for the base layer (a larger layer in thickness).

Next, the above-described non-stretched film is biaxially oriented by biaxial stretching. First, the non-stretched film is stretched at a temperature of about 90 to about 145° C. in the longitudinal and transverse directions at a longitudinal draw ratio of about 2.5 to about 4.5 times and at a transverse draw ratio of about 3.0 to about 5.2 times, respectively and, further, after the film is re-stretched at a temperature of about 100 to about 145° C. in the longitudinal direction at a draw ratio of about 1.1 to about 3.0 times and thereafter re-stretched in the transverse direction at a draw ratio of about 1.0 to about 1.5 times, the film is heat set at a temperature of about 190 to about 220° C. It is further preferable to provide a process for relaxing the film after the heat setting.

Further, as a method for controlling the irregularity in thickness in the transverse direction of the film, it is effective to determine the irregularity in thickness in the transverse direction of the film at a condition of real time immediately before winding the film in a form of a roll, and to feed back the information to a gap adjusting mechanism of a slit die for properly adjusting the gap of the slit die to achieve a uniform thickness distribution.

EXAMPLES

Hereinafter, the invention will be explained based on Examples and Comparative Examples.

Methods for determining the properties used in the invention and methods for evaluating the effects according to the invention are as follows.

(1) Mean Particle Diameter of Particles:

In a case where the mean particle diameter is determined from a film, polymer is removed from the film by plasma low temperature ashing treatment to expose the particles. The condition of the ashing treatment is selected such that the particles are not damaged, whereas the polymer is ashed. The exposed particles are observed by a scanning electron microscope (SEM) and the image of the particles is processed by an image analyzer. The magnification of the SEM is selected from about 5,000 to 20,000 times. Changing the portions to be observed, the volume mean diameter "d" of the particles of not less than 5,000 is determined from the diameters and volume rates thereof by the following equation. In a case where two or more kinds of particles having different diameters are contained, similar determination is conducted as to the respective particles, and the respective particle diameters are determined.

$$d = \Sigma di \cdot Nvi$$

Where, di is a particle diameter, and Nvi is a volume rate thereof.

In a case where the particles are greatly damaged by the plasma low temperature ashing treatment, the following method may be employed.

Using a transmission type electron microscope (TEM), the cross section of the film is observed at a magnification of 3,000 to 100,000 times. The section of the film is observed by a transmission type electron microscope (TEM) at a magnification of 3,000 to 100,000 times. The thickness of a cut sample for the measurement of the TEM is set to about 1,000 angstroms, not less than 500 fields are measured changing the fields, and the volume mean diameter "d" of the particles is determined from the above equation.

Further, in a case where a lot of single kind of particles can be obtained on the market, a centrifugal precipitation method can be employed as to the inert particles at the time of polymerization or before they are supplied to a twin-screw extruder and kneaded into polyester. For example, it is determined using a centrifugal particle size counter "CP-50" produced by Shimada Seisakusho Corporation. From an integrated curve of the particles with respective diameters and the amounts of the respective particles calculated based on the obtained centrifugal precipitation curve, a particle diameter corresponding to 50 mass percent is read, and this value is defined as the mean particle diameter.

(2) Distribution of Protrusions:

The determination of the distribution of particles is carried out using a three-dimensional microfigure measuring instrument (ET-30HK) and a three-dimensional surface roughness analyzing system (TDA-21) which are produced by Kosaka Kenkyusho Corporation. The conditions of the measurement are as follows. The average value of the data of 20 times measurement is defined as the distribution of particles. The protrusion-height distribution is determined in a range in which the number of protrusions is $30/mm^2$ or more and greater than the maximum value of the distribution curve. This is because the dispersion of the measurement is great in a region in which the number of protrusions is less than $30/mm^2$ and in a region in which the number of protrusions is less than the maximum value of the distribution curve.

| | |
|---|---|
| Radius of the tip of the stylus: | 2 μm |
| Load of the stylus: | 4 mg |
| Vertical magnification: | 5,000 times |
| Horizontal magnification: | 500 times |
| Cut off: | 0.25 mm |
| Feed pitch: | 2 μm |
| Length of measurement: | 500 μm |
| Area of measurement: | 0.04 mm² |
| Speed of measurement: | 20 μm/sec |

(3) Lamination Thickness of Film:

The depth profile of the particle density is determined by X-ray photoelectron spectrum (XPS), infrared spectroscopic analysis (IR) or a confocal microscope while etching from the surface.

In the surface of the surface layer of a laminated film, the particle density is low because the surface is an interface, and the particle density increases as the measuring position is apart from the surface. In the film laminated with a layer according to the invention, the particle density reaches the maximum at a depth [I] and, thereafter, decreases again. Based on this distribution curve of the particle density, a depth [II] which is ½ of the maximum of the particle density is defined as the lamination thickness (where, II>I). Further, in a case where inorganic particles are contained, using an apparatus of secondary ion mass spectrum (SIMS), the ratio of the density of the element originating from the particles present at the highest density in the film to the density of the carbon in the polyester ($M^+/C^+$) is defined as the particle density ratio, and the determination is carried out from the surface of the layer A in the depth direction (thickness direction). The lamination thickness is determined in a manner similar to the above-described manner.

(4) Young's Modulus:

A film is cut in a form of a sample having a width of 10 mm, the sample is set between chucks positioned at a distance of 100 mm in an Instron type tensile tester, and the Young's modulus is determined by tensile examination.

(5) Fine Irregularity in Thickness:

A film is sampled at a length of 1 m in the transverse direction of the film, and the thickness of the sample film is continuously determined at a film carrying speed of 1.5 m/min., for example, using a film thickness tester "KG601G" and electronic micrometer "K306C" produced by Anritsu Corporation. The greatest difference between the maximum thickness and the minimum thickness within 4 mm width at an arbitrary position in the transverse direction of the film is defined as the fine irregularity in thickness.

In a case where it is difficult to obtain a sample with a length of 1 m in the transverse direction of the film, the measurement may be carried out using a sample with a length less than 1 m, and the value determined in a manner similar to the above-described manner may be defined as the fine irregularity in thickness.

(6) Irregularity in Thickness in the Transverse Direction:

The thickness data of the film with a length of 1 m determined in the above-described manner are read at a 4 mm interval from the end of the film, the average film thickness (d) (μm) and the standard deviation (σ) are calculated, and the ratio (σ/d) is defined as the irregularity in thickness in the transverse direction.

(7) Number of Large Protrusions:

Two films each having a size of 10 cm square are stacked onto each other to face the surfaces to be determined to each other, the films are brought into close contact with each other by an electrostatic force generated by being applied with a voltage, and the heights of the respective protrusions are estimated from the respective interference fringes ascribed to the large protrusions on the film surface. The height of the protrusion is defined as 0.270 μm when the interference fringe exhibits as a singlet ring, 0.540 μm when it exhibits as a double ring, and 0.810 μm when it exhibits as a triple ring. As a light source, a halogen lamp applied with a band pulse filter with a wavelength of 564 nm is used.

(8) PES (Positioning Error Signal, a Value Indicating an Amount of Positional Shift in the Transverse Direction, a Value of the Standard Deviation):

A magnetic coating solution having the following composition is applied on the surface of the polyester film so that the thickness after drying and calendering becomes a undercoating layer thickness of 1.8 μm and a magnetic layer thickness of 1.8 μm, and thereafter, magnetically oriented and dried. Then, a backcoating having the following composition is applied on the opposite surface so that the thickness after drying and calendering becomes 0.5 μm, and after calendering, it is cured at 70° C. for 72 hours. The film is slit into a tape having a width of ½ inch, and the tape is incorporated into a cassette to make a cassette tape.

(Hereinafter, all Parts are by Weight.)

| (Composition of undercoating solution) | |
|---|---|
| Powder of iron oxide (mean particle diameter: 0.10 × 0.02 μm): | 70 parts |
| α-alumina (mean particle diameter: 0.07 μm): | 8 parts |
| Carbon black (mean particle diameter: 25 nm): | 25 parts |
| Stearic acid: | 1.9 parts |
| Vinyl chloride copolymer: | 8.8 parts |
| Polyester/polyurethane resin: | 4.5 parts |
| Cyclohexanone: | 105 parts |
| Methylethylketone: | 105 parts |
| Toluene: | 38 parts |
| Butyl stearate: | 1 part |
| Polyisocyanate: | 4.5 parts |
| (Composition of magnetic coating solution) | |
| Ferromagnetic iron-based metal powder: | 100 parts |
| Vinyl chloride-hydroxypropyl acrylate copolymer: | 12.4 parts |
| Polyester/polyurethane resin: | 5.5 parts |
| α-alumina (mean particle diameter: 0.12 μm): | 10 parts |
| Carbon black (mean particle diameter: 75 nm): | 1 part |
| Metal acid phosphate: | 2 parts |
| Amide palmitin: | 1.6 parts |
| n-butyl stearate: | 1 part |
| Tetrahydrofuran: | 64 parts |
| Methylethylketone: | 243 parts |
| Toluene: | 85 parts |
| Polyisocyanate: | 2 parts |
| Cyclohexanone: | 168 parts |
| (Composition of backcoating solution) | |
| Carbon black (mean particle diameter: 25 nm): | 82 parts |
| Carbon black (mean particle diameter: 370 nm): | 10 parts |
| Iron oxide (length of long axis: 0.4 μm, ratio of axes: 10): | 10 parts |
| Nitrocellulose: | 45 parts |
| Polyurethane resin: | 30 parts |
| Cyclohexanone: | 260 parts |
| Methylethylketone: | 530 parts |
| Toluene: | 260 parts |

The value of PES is determined from the variation of regeneration output when a memory (memory wavelength*0.37 μm) is regenerated, using an LTO drive in which the track width of memory is 20.5 μm and the track width of regeneration is 12 μm.

The rank of evaluation is defined as follows.

| PBS | Rank |
|---|---|
| 0–0.2 μm: | ⊚ |
| 0.2–0.3 μm: | ○ |
| 0.3–0.5 μm: | Δ |
| more than 0.5 μm: | × |

(9) Electromagnetic Conversion Property:

A magnetic coating solution and a non-magnetic coating solution having the following compositions are coated on a film surface in a layer-stacking structure by an extrusion coater (an upper layer is formed by the magnetic coating solution and its thickness of application is 0.1 μm, and the thickness of a lower layer of the non-magnetic coating solution is changed appropriately), the coated magnetic layer is magnetically oriented, and then dried. A backcoating layer having the following composition is formed on the opposite surface of the film, and after calendering the film by a small test calendering machine (steel roll/nylon roll; 5 stages) at a temperature of 85° C. and a linear pressure of 200 kg/cm, the film is cured at 60° C. for 48 hours. The film obtained is slit to make a pancake of a tape having a width of 8 mm. Then, the tape of 200 m from the pancake is incorporated into a cassette to make a cassette tape.

(All Parts are by Weight)

| (Composition of magnetic coating solution) | |
|---|---|
| Ferromagnetic metal powder: | 100 parts |
| Vinyl chloride copolymer modified with sodium sulphonate: | 10 parts |
| Polyurethane modified with sodium sulphonate: | 10 parts |
| Polyisocyanate: | 5 parts |
| Stearic acid: | 1.5 parts |
| Oleic acid: | 1 part |
| Carbon black: | 1 part |
| Alumina: | 10 parts |
| Methylethylketone: | 75 parts |
| Cyclohexane: | 75 parts |
| Toluene: | 75 parts |
| (Composition of non-magnetic coating solution) | |
| Titanium oxide: | 100 parts |
| Carbon black: | 10 parts |
| Vinyl chloride copolymer modified: with sodium sulphonate | 10 parts |
| Polyurethane modified with sodium sulphonate: | 30 parts |
| Methylethylketone: | 30 parts |
| Methyisobutylketone: | 30 parts |
| Toluene: | 30 parts |
| (Composition of backcoating solution) | |
| Carbon black (mean particle diameter: 20 nm): | 95 parts |
| Carbon black (mean particle diameter: 280 nm): | 10 parts |
| α-alumina: | 0.1 part |
| Zinc oxide: | 0.3 part |
| Vinyl chloride copolymer modified with sodium sulphonate: | 30 parts |
| Polyurethane modified with sodium sulphonate: | 20 parts |
| Cyclohexane: | 200 parts |
| Methylethylketone: | 300 parts |
| Toluene: | 100 parts |

With respect to this tape, using a Hi8 VTR on the market (EV-BS3000, produced by Sony Corporation), C/N of 7 MHz±1 MHz is measured. The measured C/N is compared with an MP video tape for Hi8 on the market, and ranked as follows.

| Result of measurement | Rank |
|---|---|
| +5 dB or more: | ⊚ |
| +3 dB or more, and less than 5 dB: | ○ |
| +1 dB or more, and less than 3 dB: | Δ |
| less than 1 dB: | × |

Among the ranks, ⊚ and ○ are defined as acceptable ranks.

(10) Difference in Shape of Pellets:

About 30 pellets are sampled and their weight is measured. The average weight of one pellet is determined, and the difference in shape of different kinds of pellets to be blended at the time of film formation (for example, master pellets and pellets which substantially do not contain particles) is calculated by the following equation.

Difference in shape of pellets (%)=((PM−PS)/PM)×100

PM: the greatest value of average weight among pellets being blended at the time of film formation (g/one pellet)

PS: the smallest value of average weight among pellets being blended at the time of film formation (g/one pellet)

EXAMPLE 1

A thermoplastic resin A1 was prepared by preparing polyethylene terephthalate pellets containing spherical silica particles having a mean particle diameter of 0.06 μm and polyethylene terephthalate pellets containing substantially no particles, and blending these two kinds of pellets so that the content of the spherical silica particles became 0.2 wt %. The average weight of the pellets containing spherical silica particles was 0.0368 g/one pellet, and the difference in shape of pellets was 8%. Similarly, a thermoplastic resin A2 to be subsequently extruded continuously was prepared. Further, a thermoplastic resin B1 was prepared by blending polyethylene terephthalate pellets containing divinylbenzene/styrene copolymerized crosslinked particles having a mean particle diameter of 0.3 μm, polyethylene terephthalate pellets containing divinylbenzene/styrene copolymerized crosslinked particles having a mean particle diameter of 0.8 μm, and polyethylene terephthalate pellets containing substantially no particles, so that the content of 0.3 μm particles became 0.25 wt % and the content of 0.8 μm particles became 0.01 wt %. The difference in shape of pellets was 6%. Similarly, a thermoplastic resin B2 to be subsequently extruded continuously was prepared.

After these thermoplastic resins were dried under a reduced pressure condition at 160° C. for 8 hours, respectively, they were supplied to extruders different from each other. While the melt viscosity of the pellets and the variation in temperature of pipes were controlled so that the difference in melt viscosity between the thermoplastic resins, being supplied to a slit die continuously or simultaneously, was controlled at 150 poise or less (between A1 and A2, between B1 and B2, and between A1 and B1), the resins were melt-extruded at 280±1° C. and filtered at a high accuracy and, thereafter, they were joined and laminated at a two-layer lamination structure at a confluence block for two-layer lamination. The melt viscosity of the pellets was controlled by adjusting the vacuum degree at the time of polymerization in a range of 0.2 to 0.4 kPa at an appropriate timing.

Then, the polymer delivered out from a slit die controlled at 290° C. was cast on a cooling roll (a casting drum) of which surface was controlled at 25° C., using an electrostatic casting method, and then cooled and solidified thereon to prepare a non-stretched film. After the non-stretched film was stretched in the longitudinal direction at a temperature of 120° C.° C. and a draw ratio of 3.2 times, the uniaxially oriented film was stretched in the transverse direction at a temperature of 100° C. and a draw ratio of 3.2 times by suing a tenter, and then the biaxially oriented film was re-stretched in the longitudinal direction at a temperature of 140° C. and a draw ratio of 1.6 times and thereafter heat set under a condition of constant length at a temperature of 205° C. for 3 seconds, and the film was served to a relax treatment to prepare a film having a thickness of 6 μm. The irregularity in the transverse direction of the polyester film was measured at a condition of real time immediately before winding the film in a form of a roll, and the information of the measured thickness was fed back to the operation for adjusting the film thickness at a gap adjusting mechanism of the slit die.

EXAMPLE 2

A biaxially oriented, laminated polyester film was prepared similarly to in Example 1 other than setting the temperature of the slit die at 285° C.

EXAMPLE 3

A biaxially oriented, laminated polyester film was prepared similarly to in Example 1 other than changing the content of particles contained in thermoplastic resin A1 and the thickness of the film.

EXAMPLE 4

A biaxially oriented, laminated polyester film was prepared similarly to in Example 1 other than changing the kinds, particle diameters and contents of particles to be contained in thermoplastic resins A1 and B1 and the difference in shape of the pellets.

EXAMPLE 5

A biaxially oriented, laminated polyester film was prepared similarly to in Example 1 other than changing the particle diameter and content of particles to be contained in thermoplastic resin A1 and the difference in shape of the pellets, and changing the draw ratios in the longitudinal and transverse directions.

Comparative Example 1

A biaxially oriented, laminated polyester film was prepared similarly to in Example 1 other than continuously extruding pellets in which the difference in melt viscosity between thermoplastic resins A1 and A2 was 350 poise.

Comparative Example 2

A biaxially oriented, laminated polyester film was prepared similarly to in Example 3 other than continuously extruding pellets in which the difference in melt viscosity between thermoplastic resins A1 and A2 was 350 poise.

Comparative Example 3

A biaxially oriented, laminated polyester film was prepared similarly to in Example 4 other than continuously extruding pellets in which the difference in melt viscosity between thermoplastic resins A1 and A2 was 350 poise.

Comparative Example 4

A biaxially oriented, laminated polyester film was prepared similarly to in Example 5 other than continuously extruding pellets in which the difference in melt viscosity between thermoplastic resins A1 and A2 was 350 poise.

Comparative Example 5

A biaxially oriented, laminated polyester film was prepared similarly to in Example 1 other than setting the temperature of the slit die at 280° C., changing the content of particles to be contained in thermoplastic resin A1 and not optimizing the thickness control mechanism of the die.

Comparative Example 6

A biaxially oriented, laminated polyester film was prepared similarly to in Example 1 other than setting the temperature of the slit die at 280° and changing the particle diameter and content of particles to be contained in thermoplastic resin A1.

Comparative Example 7

A biaxially oriented, laminated polyester film was prepared similarly to in Example 1 other than setting the temperature of the slit die at 280° C. and changing the kind and particle diameter of particles to be contained in thermoplastic resin B1.

Comparative Example 8

A biaxially oriented, laminated polyester film was prepared similarly to in Example 1 other than setting the temperature of the slit die at 280° C. and changing the content of particles to be contained in thermoplastic resin B1.

Comparative Example 9

A biaxially oriented, laminated polyester film was prepared similarly to in Example 1 other than setting the temperature of the slit die at 280° C. and changing the draw ratios in the longitudinal and transverse directions.

Comparative Example 10

A biaxially oriented, laminated polyester film was prepared similarly to in Example 1 other than setting the temperature of the slit die at 280° C. and changing the draw ratios in the longitudinal and transverse directions and the difference in shape of pellets.

Comparative Example 11

A biaxially oriented, laminated polyester film was prepared similarly to in Example 1 other than setting the temperature of the slit die at 280° C. and using a filter with a low efficiency for trapping foreign materials.

Comparative Example 12

A biaxially oriented, laminated polyester film was prepared similarly to in Example 1 other than controlling the temperature of the filter and the pipe, through which the molten polymer passed, at 280±5° C.

Comparative Example 13

A biaxially oriented, laminated polyester film was prepared similarly to in Example 1 other than using thermoplastic resin A1 in which pellets containing spherical silica particles and having an average weight of 0.0665 g/one pellet were contained and the difference in shape of the used pellets was 45%.

Figure 1:
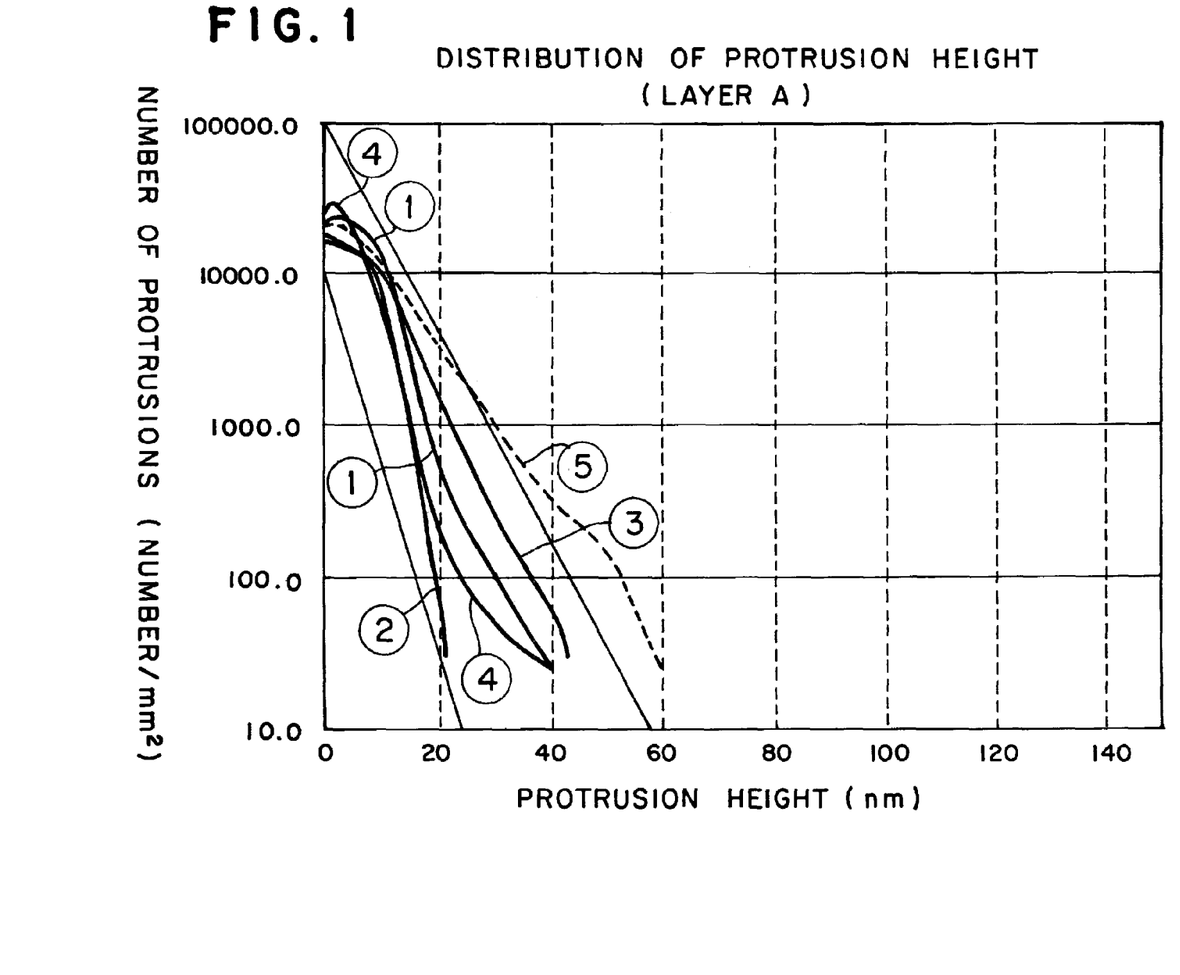
FIG. 1 is a graph showing protrusion-height distributions of layers (A) in Examples and Comparative Examples.
Figure 2:
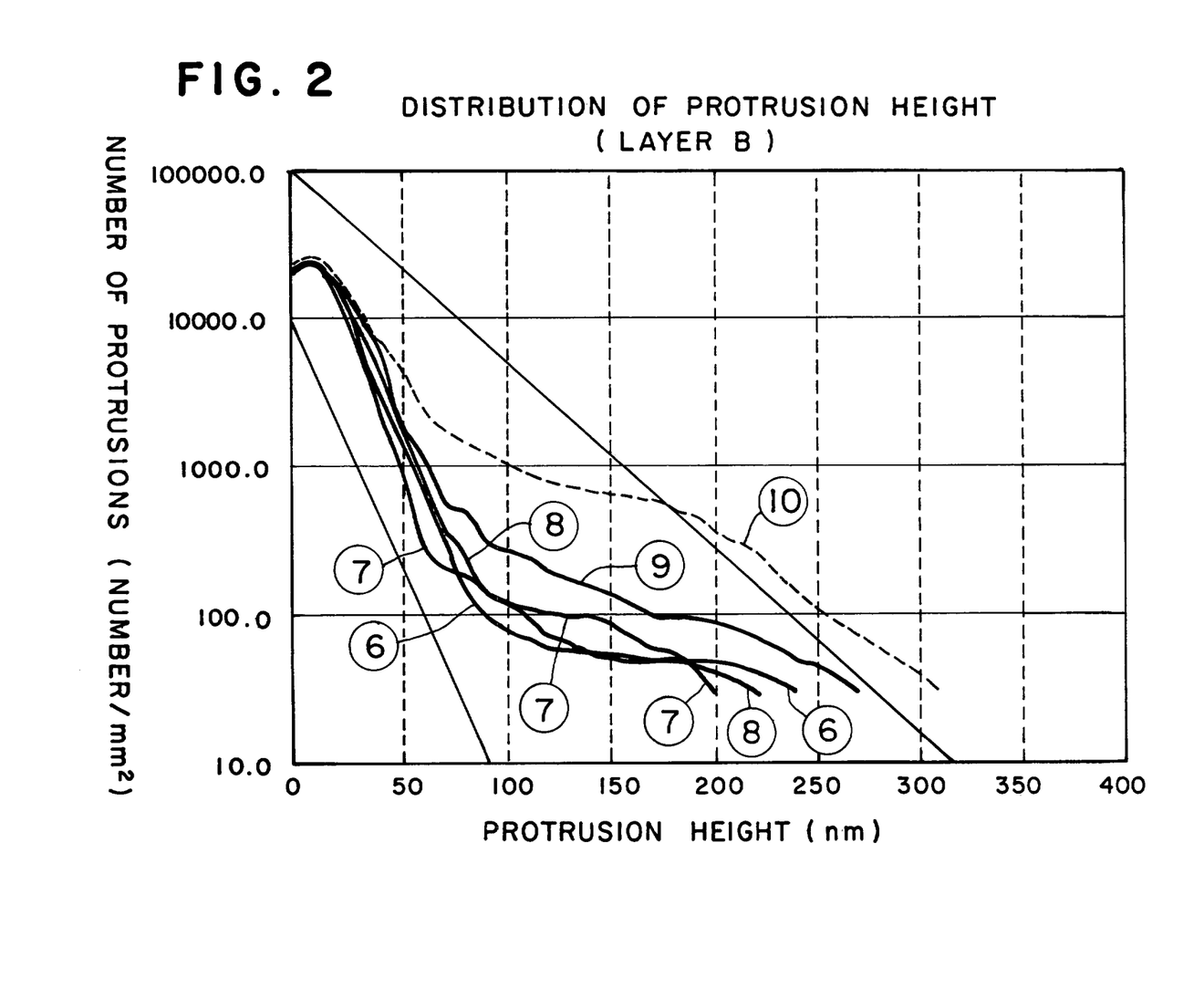
FIG. 2 is a graph showing protrusion-height distributions of layers (B) in Examples and Comparative Examples.

The results of the above-described Examples and Comparative Examples are shown in Tables 1 to 3. Further, FIGS. 1 and 2 show protrusion-height distributions of layers (A) and layers (B) in the Examples and Comparative Examples. In FIGS. 1 and 2, the region between two straight lines indicates a desirable range defined in the invention (the aforementioned respective equations (1) and (2)).

Thus, the biaxially oriented, laminated polyester film according to the invention can satisfy both the electromagnetic conversion property and the running ability at a high level, and it is very useful as a base film for a large capacity tape for data storage.

TABLE 1

| | Example | | | | |
|---|---|---|---|---|---|
| | 1 | 2 | 3 | 4 | 5 |
| Film thickness ($\mu$m) | 6 | 6 | 5 | 6 | 6 |
| Lubricant in layer A | | | | | |
| Inert particle I | spherical silica | spherical silica | spherical silica | spherical silica | spherical silica |
| Particle diameter ($\mu$m) | 0.06 | 0.06 | 0.06 | 0.12 | 0.07 |
| Content (wt %) | 0.2 | 0.2 | 0.1 | 0.1 | 0.1 |
| Dispersion of pellet form (%) | 8 | 8 | 8 | 12 | 18 |
| Lubricant in layer B | | | | | |
| Inert particle II | organic particle | organic particle | organic particle | spherical silica | organic particle |
| Particle diameter ($\mu$m) | 0.3 | 0.3 | 0.3 | 0.3 | 0.3 |
| Content (wt %) | 0.25 | 0.25 | 0.25 | 0.1 | 0.25 |
| Inert particle III | organic particle | organic particle | organic particle | spherical silica | organic particle |
| Particle diameter ($\mu$m) | 0.8 | 0.8 | 0.8 | 0.5 | 0.8 |
| Content (wt %) | 0.01 | 0.01 | 0.01 | 0.05 | 0.01 |
| Young's modulus (MPa) | | | | | |
| Longitudinal direction | 6742 | 6732 | 6702 | 6735 | 8523 |
| Transverse direction | 4913 | 4856 | 4925 | 4825 | 4012 |
| Longitudinal direction/Transverse direction | 1.37 | 1.39 | 1.36 | 1.40 | 2.12 |
| Distribution of Protrusions | | | | | |
| Layer A | ① | ① | ② | ③ | ④ |
| Layer B | ⑥ | ⑥ | ⑥ | ⑦ | ⑧ |
| Irregularity in film thickness in the transverse direction ($\sigma$/d) | 0.007 | 0.009 | 0.01 | 0.009 | 0.008 |
| Fine irregularity in thickness ($\mu$m) | 0.05 | 0.09 | 0.06 | 0.07 | 0.06 |
| Number of large | | | | | |

TABLE 1-continued

|  | Example 1 | Example 2 | Example 3 | Example 4 | Example 5 |
|---|---|---|---|---|---|
| Protrusions | | | | | |
| 0.270 μm or more (number/100 cm²) | 15 | 60 | 70 | 80 | 90 |
| 0.540 μm or more (number/100 cm²) | 0 | 0 | 2 | 1 | 2 |
| 0.810 μm or more (number/100 cm²) | 0 | 0 | 0 | 0 | 0 |
| PES | ◯◯ | ◯ | ◯◯ | ◯ | ◯◯ |
| Electromagnetic conversion property | ◯◯ | ◯ | ◯◯ | ◯ | ◯ |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Film thickness (μm) | 6 | 5 | 6 | 6 | 6 | 6 |
| Lubricant in layer A | | | | | | |
| Inert particle I | spherical silica | spherical silica | spherical silica | spherical silica | spherical silica | organic particle |
| Particle diameter (μm) | 0.06 | 0.06 | 0.12 | 0.07 | 0.06 | 0.3 |
| Content (wt %) | 0.2 | 0.1 | 0.1 | 0.1 | 0.1 | 0.03 |
| Dispersion of pellet form (%) | 8 | 8 | 12 | 18 | 8 | 12 |
| Lubricant in layer B | | | | | | |
| Inert particle II | organic particle | organic particle | spherical silica | organic particle | organic particle | organic particle |
| Particle diameter (μm) | 0.3 | 0.3 | 0.3 | 0.3 | 0.3 | 0.3 |
| Content (wt %) | 0.25 | 0.25 | 0.1 | 0.25 | 0.25 | 0.25 |
| Inert particle III | organic particle | organic particle | spherical silica | organic particle | organic particle | organic particle |
| Particle diameter (μm) | 0.8 | 0.8 | 0.5 | 0.8 | 0.8 | 0.8 |
| Content (wt %) | 0.01 | 0.01 | 0.05 | 0.01 | 0.01 | 0.01 |
| Young's modulus (MPa) | | | | | | |
| Longitudinal direction | 6740 | 6738 | 6711 | 8546 | 6760 | 6734 |
| Transverse direction | 4930 | 4830 | 4912 | 4026 | 4856 | 4840 |
| Longitudinal direction/Transverse direction | 1.37 | 1.40 | 1.37 | 2.12 | 1.39 | 1.39 |
| Distribution of protrusions | | | | | | |
| Layer A | ① | ② | ③ | ④ | ② | ⑤ |
| Layer B | ⑥ | ⑥ | ⑦ | ⑧ | ⑥ | ⑥ |
| Irregularity in film thickness in the transverse direction (σ/d) | 0.008 | 0.010 | 0.012 | 0.011 | 0.019 | 0.008 |
| Fine irregularity in thickness (μm) | 0.18 | 0.16 | 0.15 | 0.17 | 0.11 | 0.13 |
| Number of large protrusions | | | | | | |
| 0.270 μm or more (number/100 cm²) | 30 | 70 | 80 | 90 | 90 | 40 |
| 0.540 μm or more (number/100 cm²) | 0 | 2 | 1 | 2 | 1 | 1 |
| 0.810 μm or more (number/100 cm²) | 0 | 0 | 0 | 0 | 0 | 0 |
| PES | X | X | Δ | X | Δ | Δ |
| Electromagnetic conversion property | Δ | Δ | Δ | X | Δ | Δ |

TABLE 3

| | Comparative Example | | | | | | |
|---|---|---|---|---|---|---|---|
| | 7 | 8 | 9 | 10 | 11 | 12 | 13 |
| Film thickness ($\mu$m) | 6 | 6 | 6 | 6 | 6 | 6 | 6 |
| Lubricant in layer A | | | | | | | |
| Inert particle I | spherical silica | spherical silica | spherical silica | spherical silica | spherical silica | spherical silica | spherical silica |
| Particle diameter ($\mu$m) | 0.06 | 0.06 | 0.06 | 0.06 | 0.06 | 0.06 | 0.06 |
| Content (wt %) | 0.2 | 0.2 | 0.2 | 0.2 | 0.2 | 0.2 | 0.2 |
| Dispersion of pellet form (%) | 8 | 9 | 8 | 10 | 9 | 10 | 45 |
| Lubricant in layer B | | | | | | | |
| Inert particle II | Organic particle | organic particle | organic particle | organic particle | organic particle | organic particle | organic particle |
| Particle diameter ($\mu$m) | 0.3 | 0.3 | 0.3 | 0.3 | 0.3 | 0.3 | 0.3 |
| Content (wt %) | 0.25 | 0.6 | 0.25 | 0.25 | 0.25 | 0.25 | 0.25 |
| Inert particle III | calcium carbonate | organic particle | organic particle | organic particle | organic particle | organic particle | organic particle |
| Particle diameter ($\mu$m) | 1.1 | 0.8 | 0.8 | 0.8 | 0.8 | 0.8 | 0.8 |
| Content (wt %) | 0.01 | 0.05 | 0.01 | 0.01 | 0.01 | 0.01 | 0.01 |
| Young's modulus (MPa) | | | | | | | |
| Longitudinal direction | 6740 | 6724 | 5362 | 9980 | 6742 | 6780 | 6742 |
| Transverse direction | 4930 | 4815 | 5782 | 3800 | 4842 | 4950 | 4913 |
| Longitudinal direction/Transverse direction | 1.37 | 1.40 | 0.93 | 2.63 | 1.39 | 1.37 | 1.37 |
| Distribution of protrusions | | | | | | | |
| Layer A | ① | ① | ① | ① | ① | ① | ① |
| Layer B | ⑨ | ①⑩ | ⑥ | ⑥ | ⑥ | ⑥ | ⑥ |
| Irregularity in film thickness in the transverse direction ($\sigma$/d) | 0.007 | 0.009 | 0.008 | 0.007 | 0.007 | 0.010 | 0.007 |
| Fine irregularity in thickness ($\mu$m) | 0.12 | 0.11 | 0.14 | 0.11 | 0.13 | 0.16 | 0.17 |
| Number of large protrusions | | | | | | | |
| 0.270 $\mu$m or more (number/100 cm$^2$) | 30 | 80 | 80 | 50 | 180 | 60 | 130 |
| 0.540 $\mu$m or more (number/100 cm$^2$) | 0 | 0 | 1 | 0 | 5 | 1 | 1 |
| 0.810 $\mu$m or more (number/100 cm$^2$) | 0 | 0 | 0 | 0 | 2 | 0 | 0 |
| PES | Δ | Δ | Δ | Δ | Δ | X | X |
| Electromagnetic conversion property | X | Δ | X | X | X | Δ | X |

Although several embodiments of the invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. A biaxially oriented, laminated polyethylene terephthalate film having at least two layers, wherein an irregularity in film thickness determined within 4 mm width at an arbitrary position in a transverse direction of said film is about 0.1 $\mu$m or less, wherein Young's moduli in longitudinal and transverse directions of said film are in a range of about 3,500 to about 10,000 MPa, respectively, and the ratio of both Young's moduli (longitudinal/transverse) is in a range of about 1.0 to about 2.5.

2. The biaxially oriented, laminated polyethylene terephthalate film according to claim 1, wherein a ratio ($\sigma$/d) of a standard deviation of film thickness ($\sigma$) to an average film thickness (d) in the transverse direction of said film is about 0.015 or less.

3. The biaxially oriented, laminated polyethylene terephthalate film according to claim 1, wherein a first protrusion-height distribution indicating a relationship between heights of protrusions ($H_A$ [nm]) and numbers of protrusions at respective protrusion heights ($Y_A$ [number/mm$^2$]) on a surface of one surface layer (A) satisfies equation (1), and a second protrusion-height distribution indicating a relationship between heights of protrusions ($H_B$ [nm]) and numbers of protrusions at respective protrusion heights ($Y_B$ [number/mm$^2$]) on a surface of another surface layer (B) satisfies equation (2):

$$-0.12 \times H_A + 4 \leq \log_{10} Y_A \leq -0.07 \times H_A + 5 \quad (1)$$

$$-0.033 \times H_B + 4 \leq \log_{10} Y_B \leq -0.0125 \times H_B + 5 \quad (2).$$

4. The biaxially oriented, laminated polyethylene terephthalate film according to claim 3, wherein inert particles I having a mean primary particle diameter of about 0.02 to about 0.15 $\mu$m are contained in said surface layer (A) at a content of about 0.001 to about 0.25 wt %, based on the weight of the film.

5. The biaxially oriented, laminated polyethylene terephthalate film according to claim 3, wherein at least two kinds of inert particles II and III having mean particle diameters different from each other are contained in said surface layer (B), the mean particle diameter of said inert particles II is in a range of about 0.1 to about 0.4 μm and the content thereof is in a range of about 0.1 to about 0.4 wt %, based on the weight of the film, and the mean particle diameter of said inert particles III is greater than that of said inert particles II and is in a range of about 0.3 to about 1.0 μm and the content thereof is in a range of about 0.002 to about 0.1 wt %, based on the weight of the film.

6. The biaxially oriented, laminated polyethylene terephthalate film according to claim 3, wherein on the surface of said surface layer (A), the number of large protrusions having a height of more than 0.270 μm is about 100/100 cm² or less, the number of large protrusions having a height of more than 0.540 μm is about 2/100 cm² or less, and the number of large protrusions having a height of more than 0.810 μm is about 0.1/100 cm² or less.

7. The biaxially oriented, laminated polyethylene terephthalate film according to claim 1, wherein a layer having a good adhesive property is provided on at least one surface of said film.

8. The biaxially oriented, laminated polyethylene terephthalate film according to claim 1, wherein said film is a base film for high-density magnetic recording media.

9. A biaxially oriented, laminated polyethylene terephthalate film having at least two layers, wherein:
   an irregularity in film thickness determined within 4 mm width at an arbitrary position in a transverse direction of said film is about 0.1 μm or less;
   a first protrusion-height distribution indicating a relationship between heights of protrusions ($H_A$ [nm]) and numbers of protrusions at respective protrusion heights ($Y_A$ [number/mm²]) on a surface of one surface layer (A) satisfies equation (1), and a second protrusion-height distribution indicating a relationship between heights of protrusions ($H_B$ [nm]) and numbers of protrusions at respective protrusion heights ($Y_B$ [number/mm²]) on a surface of another surface layer (B) satisfies equation (2):

$$-0.12 \times H_A + 4 \leq \log_{10} Y_A \leq -0.07 \times H_A + 5 \qquad (1)$$

$$-0.033 \times H_B + 4 \leq \log_{10} Y_B \leq -0.0125 \times H_B + 5 \qquad (2);$$

inert particles I having a mean primary particle diameter of about 0.02 to about 0.15 μm are contained in said surface layer (A) at a content of about 0.001 to about 0.25 wt %, based on the weight of the film; and
   at least two kinds of inert particles II and III having mean particle diameters different from each other are contained in said surface layer (B), the mean particle diameter of said inert particles II is in a range of about 0.1 to about 0.4 μm and the content thereof is in a range of about 0.1 to about 0.4 wt %, based on the weight of the film, and the mean particle diameter of said inert particles III is greater than that of said inert particles II and is in a range of about 0.3 to about 1.0 μm and the content thereof is in a range of about 0.002 to about 0.1 wt %, based on the weight of the film, wherein Young's moduli in longitudinal and transverse directions of said film are in a range of about 3,500 to about 10,000 MPa, respectively, and the ratio of both Young's moduli (longitudinal/transverse) is in a range of about 1.0 to about 2.5.

10. A biaxially oriented, laminated polyethylene terephthalate film having at least two layers, wherein:
   an irregularity in film thickness determined within 4 mm width at an arbitrary position in a transverse direction of said film is about 0.1 μm or less;
   a first protrusion-height distribution indicating a relationship between heights of protrusions ($H_A$ [nm]) and numbers of protrusions at respective protrusion heights ($Y_A$ [number/mm²]) on a surface of one surface layer (A) satisfies equation (1), and a second protrusion-height distribution indicating a relationship between heights of protrusions ($H_B$ [nm]) and numbers of protrusions at respective protrusion heights ($Y_B$ [number/mm²]) on a surface of another surface layer (B) satisfies equation (2):

$$-0.12 \times H_A + 4 \leq \log_{10} Y_A \leq -0.07 \times H_A + 5 \qquad (1)$$

$$-0.033 \times H_B + 4 \leq \log_{10} Y_B \leq -0.0125 \times H_B + 5 \qquad (2);$$

inert particles I having a mean primary particle diameter of about 0.02 to about 0.15 μm are contained in said surface layer (A) at a content of about 0.001 to about 0.25 wt %, based on the weight of the film; and
   at least two kinds of inert particles II and III having mean particle diameters different from each other are contained in said surface layer (B), the mean particle diameter of said inert particles II is in a range of about 0.1 to about 4.0 μm and the content thereof is in a range of about 0.1 to about 0.4 wt %, based on the weight of the film, and the mean particle diameter of said inert particles III is greater than that of said inert particles II and is in a range of about 0.3 to about 1.0 μm and the content thereof is in a range of about 0.002 to about 0.1 wt %, based on the weight of the film,
   wherein Young's moduli in longitudinal and transverse directions of said film are in a range of about 3,500 to about 10,000 MPa, respectively, and the ratio of both Young's moduli (longitudinal/transverse) is in a range of about 1.0 to about 2.5, and
   wherein on the surface of said surface layer (A), the number of large protrusions having a height of more than 0.270 μm is about 100/100 cm² or less, the number of large protrusions having a height of more than 0.540 μm is about 2/100 cm² or less, and the number of large protrusions having a height of more than 0.810 μm is about 0.1/100 cm² or less.

* * * * *

UNITED STATES PATENT AND TRADEMARK OFFICE
CERTIFICATE OF CORRECTION

| | |
|---|---|
| PATENT NO. | : 6,984,435 B2 |
| APPLICATION NO. | : 10/331723 |
| DATED | : January 10, 2006 |
| INVENTOR(S) | : Kobayashi et al. |

It is certified that error appears in the above-identified patent and that said Letters Patent is hereby corrected as shown below:

<u>Column 1,</u>
Line 66, change "0)" to -- σ --.

Signed and Sealed this

Twenty-seventh Day of June, 2006

JON W. DUDAS
*Director of the United States Patent and Trademark Office*